(12) United States Patent
Ma et al.

(10) Patent No.: US 11,432,525 B2
(45) Date of Patent: Sep. 6, 2022

(54) EXCREMENT SCREENING DEVICE AND METHOD

(71) Applicant: PETKIT Network Technology (Shanghai) Co., Ltd., Shangahi (CN)

(72) Inventors: Yunxin Ma, Shanghai (CN); Xin Shi, Shanghai (CN); Xiaoqing Ma, Shanghai (CN); Feng Li, Shanghai (CN); Junchao Zhang, Shanghai (CN)

(73) Assignee: Petkit Network Technology (Shangahi) Co., Ltd., Shanghai (CN)

( * ) Notice: Subject to any disclaimer, the term of this patent is extended or adjusted under 35 U.S.C. 154(b) by 135 days.

(21) Appl. No.: 16/977,706

(22) PCT Filed: Mar. 9, 2020

(86) PCT No.: PCT/CN2020/078369
§ 371 (c)(1),
(2) Date: Sep. 2, 2020

(87) PCT Pub. No.: WO2021/036224
PCT Pub. Date: Mar. 4, 2021

(65) Prior Publication Data
US 2021/0267158 A1 Sep. 2, 2021

(30) Foreign Application Priority Data

Aug. 29, 2019 (CN) .......................... 201910809126.6

(51) Int. Cl.
*A01K 1/01* (2006.01)
(52) U.S. Cl.
CPC .................................. *A01K 1/0114* (2013.01)
(58) Field of Classification Search
CPC ..... A01K 1/0114; A01K 1/011; A01K 1/0107
(Continued)

(56) References Cited

U.S. PATENT DOCUMENTS 5,509,379 A * 4/1996 Hoeschen ............ A01K 1/0114
209/288
5,662,066 A * 9/1997 Reitz .................... A01K 1/0114
119/163
(Continued)

FOREIGN PATENT DOCUMENTS

CN 207653240 U 7/2018
CN 109122337 A 1/2019
(Continued)

OTHER PUBLICATIONS

PCT International Search Report and Written Opinion dated Jun. 3, 2020 for PCT/CN2020/078369.

*Primary Examiner* — Yvonne R Abbott-Lewis
(74) *Attorney, Agent, or Firm* — McCarter & English, LLP (57) ABSTRACT

Disclosed are an excrement screening device and method. The excrement screening device includes a rotary receiving piece, a litter blocking piece and a screening piece. The rotary receiving piece is configured to receive cat litter and the rotary receiving piece is provided with a waste discharge outlet. The litter blocking piece is disposed in the rotary receiving piece and the litter blocking piece is configured to block the cat litter in a case where the rotary receiving piece rotates along a first direction. The screening piece is disposed in the rotary receiving piece, the screening piece is provided with a plurality of screening holes, and an accommodating cavity is formed by the screening piece, the litter blocking piece and the rotary receiving piece. The excrement screening method uses the above-mentioned excrement screening device.

12 Claims, 6 Drawing Sheets

(58) Field of Classification Search
USPC .................................. 119/163, 165, 161, 168
See application file for complete search history.

(56) References Cited

U.S. PATENT DOCUMENTS

| | | | | |
|---|---|---|---|---|
| 6,463,881 | B1* | 10/2002 | Reitz | A01K 1/0114 |
| | | | | 119/170 |
| 8,413,608 | B2* | 4/2013 | Sharp | A01K 1/0107 |
| | | | | 119/166 |
| 8,757,094 | B2* | 6/2014 | Baxter | A01K 1/0114 |
| | | | | 119/168 |
| 2002/0139312 | A1* | 10/2002 | Reitz | A01K 1/0114 |
| | | | | 119/165 |
| 2011/0088630 | A1* | 4/2011 | Krotts | A01K 1/0114 |
| | | | | 119/166 |
| 2011/0214614 | A1* | 9/2011 | Sharp | A01K 29/00 |
| | | | | 119/166 |
| 2013/0333625 | A1* | 12/2013 | Baxter | A01K 1/011 |
| | | | | 119/166 |
| 2017/0231190 | A1* | 8/2017 | Brawn | A01K 1/0114 |
| | | | | 119/166 |

FOREIGN PATENT DOCUMENTS

| | | | | |
|---|---|---|---|---|
| CN | 109156367 A | | 8/2019 | |
| CN | 110169368 A | | 8/2019 | |
| CN | 110169369 A | | 8/2019 | |
| CN | 112470951 A | * | 3/2021 | .......... A01K 1/0047 |
| WO | WO 2014039972 A1 | | 3/2014 | |

* cited by examiner

EXCREMENT SCREENING DEVICE AND METHOD

The present disclosure claims priority to Chinese Patent Application No. 201910809126.6 filed on Aug. 29, 2019, the disclosure of which is incorporated herein by reference in its entirety.

TECHNICAL FIELD

This patent application is a 35 U.S.C. § 371 National Stage filing of International Application No. PCT/CN2020/078369, filed on Mar. 9, 2020, which application claims priority to Chinese Patent Application No. 201910809126.6 filed on Aug. 29, 2019, the disclosure of which is incorporated herein by reference in its entirety.

BACKGROUND

As people's material living standards continue to improve, the requirement for spiritual life is also gradually improving, so more and more people like to keep pet cats. Although many cat lovers like pet cats very much, they don't have time to clean up the excrement produced by pet cats. Therefore, special pet cat toilets appear for pet cats. Unlike other pets, cats use toilets with cat litter by nature. In common cat litter cleaning methods, granular excrement in the cat litter is often picked out by using a shove. However, during the cleaning process, an owner's hands will inevitably touch the excrement and thus be soiled, which is extremely inconvenient. Actually, it is impossible to completely filter out the excrement in the cat litter, so the cat litter stained with excrement is still mixed in the clean cat litter. In order to maintain hygiene and cleanliness, the owner must frequently replace the cat litter, resulting in the waste of the cat litter.

Most of the pet cat toilets in the related art are of an open design. After the pet cat excretes in the open-designed toilet, the owner needs to personally intervene in the cleaning of the pet excrement, which costs the owner a lot of time. Meanwhile, if the pet excrement is not dealt with in time, the smell of pet excrement will seriously affect the indoor air environment, which will bring a lot of inconvenience to the owner's daily life.

SUMMARY

The present disclosure provides an excrement screening device, which is convenient to operate and does not require frequent replacement of cat litter, and automatic screening of pet cat's excrement is achieved. The present disclosure further provides an excrement screening method, which is convenient to operate and does not require frequent replacement of the cat litter, and automatic screening of pet cat's excrement is achieved.

The present disclosure provides an excrement screening device. The device includes: a rotary receiving piece, a litter blocking piece and a screening piece.

The rotary receiving piece is configured to receive the cat litter, where the rotary receiving piece is provided with a waste discharge outlet.

The litter blocking piece is disposed in the rotary receiving piece, where the litter blocking piece is configured to block the cat litter in a case where the rotary receiving piece rotates along a first direction.

The screening piece is disposed in the rotary receiving piece, where the screening piece is provided with a plurality of screening holes, and an accommodating cavity is formed by the screening piece, the litter blocking piece and the rotary receiving piece.

The present disclosure provides an excrement screening method. The method uses any excrement screening device described above, and includes steps described below.

The rotary receiving piece rotates along the first direction from an initial position.

The cat litter mixed with excrement is filtered and screened through the screening piece.

The cat litter enters the accommodating cavity and is blocked by the litter blocking piece.

The excrement is discharged through the waste discharge outlet.

The rotary receiving piece rotates to the initial position along a direction opposite to the first direction.

The cat litter in the accommodating cavity returns to a preset position.

1—rotary receiving piece; 2—litter blocking piece; 3—screening piece; 4—supporting seat; 5—center axis base;

11—waste discharge outlet; 12—first mounting shaft; 13—driven gear; 14—accommodating cavity; 15—inlet and outlet;

31—screening hole; 32—first mounting sleeve; 33—second mounting sleeve;

41—auxiliary supporting wheel;

100—cat litter; 200—excrement.

DETAILED DESCRIPTION

Solutions in the present disclosure will be described below in detail in conjunction with the drawings. The embodiments described below are part, not all of the embodiments of the present disclosure.

In the description of the present disclosure, the orientations or position relations indicated by terms such as "center", "above", "below", "left", "right", "vertical", "horizontal", "inside", "outside" and the like are based on orientations or position relations shown in the drawings. These orientations or position relations are intended only to facilitate and simplify description of the present disclosure, and not to indicate or imply that a device or element referred to must have such specific orientations or must be configured or operated in such specific orientations. Thus, these orientations or position relations are not to be construed as limiting the present disclosure. In addition, terms such as "first" and "second" are used merely for the purpose of description and are not to be construed as indicating or implying relative importance. The terms "first position" and "second position" are two different positions.

In the description of the present disclosure, unless otherwise expressly specified and limited, the term "mounting", "connected to each other", or "connected" is to be construed in a broad sense, for example, as securely connected or detachably connected; mechanically connected or electrically connected; directly connected to each other or indirectly connected to each other via an intermediary; or internally connected between two elements. Specific meanings of the preceding terms in the present disclosure may be understood based on specific situations.

The embodiment provides an excrement screening device which screens cat litter mixed with excrement and thus provides a good and clean defecation place for a pet cat. As shown in FIGS. 1-4, the excrement screening device includes a rotary receiving piece 1, a litter blocking piece 2 and a screening piece 3. Cat litter 100 (not shown in FIGS. 1-4) is laid in the rotary receiving piece 1. After the pet cat enters the rotary receiving piece 1 and excretes on the cat litter 100, the litter blocking piece 2 is configured to block the cat litter 100 in the rotary receiving piece 1, and the screening piece 3 is configured to screen the excrement 200 in the cat litter 100. In this embodiment, the rotary receiving piece 1 may be in the shape of a barrel and may be formed by splicing a front half barrel and a rear half barrel, the litter blocking piece 2 may be in the shape of a plate, and the screening piece 3 may be in the shape of an arc plate.

In one embodiment, the rotary receiving piece 1 is configured to receive the cat litter 100, and a side wall of the rotary receiving piece 1 is provided with a waste discharge outlet 11. The length direction of the waste discharge outlet 11 may be parallel to the axial direction of the rotary receiving piece 1. The litter blocking piece 2 is disposed in the rotary receiving piece 1, and the litter blocking piece 2 is configured to block the cat litter in the case where the rotary receiving piece rotates along a first direction. The litter blocking piece 2 may be integrally formed with the rotary receiving piece 1, with a side wall of the waste discharge outlet 11 as a root portion for extension. The screening piece 3 is disposed in the rotary receiving piece 1. The screening piece 3 is provided with a plurality of screening holes 31, and an accommodating cavity 14 is formed by the screening piece 3, the litter blocking piece 2 and the rotary receiving piece 1. The screening piece 3 and the litter blocking piece 2 are both located on a same side of the waste discharge outlet 11, facilitating the formation of the accommodating cavity 14. The screening hole 31 may be in the shape of a regular hexagon, thus being attractive and elegant, and providing high screening efficiency.

During use, the cat litter 100 is placed in the rotary receiving piece 1. After the pet cat excretes the excrement 200 into the cat litter 100 and exits the rotary receiving piece 1, the rotary receiving piece 1 is caused to rotate along the first direction, and the cat litter 100 mixed with the excrement 200 is filtered and screened through the screening holes 31 of the screening piece 3. Then the cat litter 100 enters the accommodating cavity 14 and is blocked by the litter blocking piece 2. As the rotary receiving piece 1 rotates, under the action of gravity, the excrement 200 screened from the surface of the screening piece 3 is discharged through the waste discharge outlet 11. The rotary receiving piece 1 rotates along a direction opposite to the first direction to an initial position, and the clean cat litter 100 in the accommodating cavity returns to a preset position.

To ensure rotation stability of the rotary receiving piece 1, in one example, the excrement screening device further includes a supporting seat 4, and the supporting seat 4 is provided with a plurality of auxiliary supporting wheels 41 configured to bear the rotary receiving piece 1. In the embodiment, the supporting seat 4 is provided with four auxiliary supporting wheels 41, and the four auxiliary supporting wheels 41 are distributed at four corners of the supporting seat 4 to evenly support the rotary receiving piece 1 under stress and assist the rotary receiving piece 1 to rotate. In other embodiments, six, eight or more auxiliary supporting wheels 41 may be provided according to the disclosure and the bearing load required by the rotary receiving piece 1. To facilitate collection of the excrement 200 or old cat litter 100 discharged from the waste discharge outlet 11, in one example, a waste discharge channel (not shown in the figures) is provided in the supporting seat 4, and a storage box (not shown in the figures) is provided below the waste discharge channel.

To facilitate driving of the rotary receiving piece 1, in one example, the rotary receiving piece 1 is connected with a drive assembly, and the drive assembly is configured to drive the rotary receiving piece 1 to rotate about the axis of the rotary receiving piece 1. In the embodiment, the rotary receiving piece 1 is provided with an integrally formed driven gear 13, and the rotary receiving piece 1 is rotatably disposed on a center axis base 5 through a shaft and a bearing connection structure to achieve the rotation about the axis. The drive assembly adopts a common drive motor and a driving gear, the driving gear is located below the driven gear 13 and is meshed with the driven gear 13. An output end of the drive motor transmits power to the driving gear, and the driving gear transmits the power to the driven gear 13 so as to drive the rotary receiving piece 1 to rotate about the axis, thereby providing driving force for the rotation of the rotary receiving piece 1. To facilitate the detection of whether a pet cat enters and exits the inlet and outlet 15 of the rotary receiving piece 1, in one example, a detection module (not shown in the figures) is provided at the inlet and outlet 15 of the rotary receiving piece 1, and the detection module is configured to detect whether the pet cat passes through the inlet and outlet 15 of the rotary receiving piece 1. During the screening process, if the detection module detects that the pet cat enters the rotary receiving piece 1, the screening process needs to be urgently stopped by the drive assembly. The detection module may be a commercially available infrared reception module, such as a kingsensor C20-4810 infrared detection grating sensor manufactured by Shenzhen Kingsensor Technology Co., Ltd.

Figure 1:
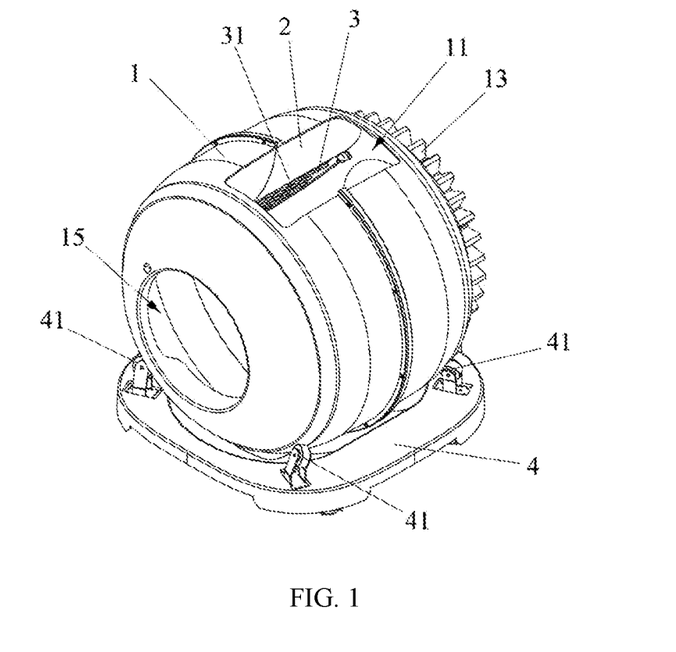
FIG. 1 is an axonometric view of an excrement screening device according to an embodiment of the present disclosure.
Figure 2:
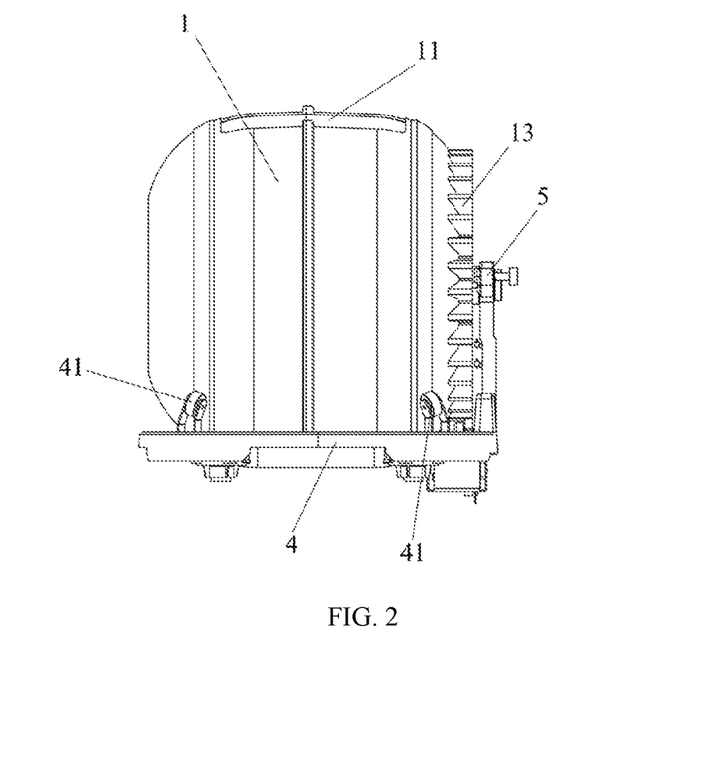
FIG. 2 is a side view of an excrement screening device according to an embodiment of the present disclosure.
Figure 3:
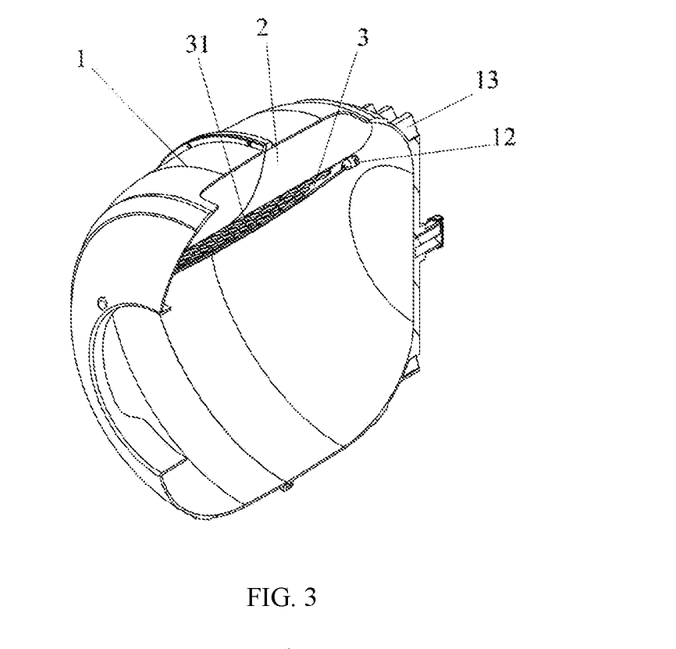
FIG. 3 is a longitudinal semi-sectional view of an excrement screening device according to an embodiment of the present disclosure.
Figure 4:
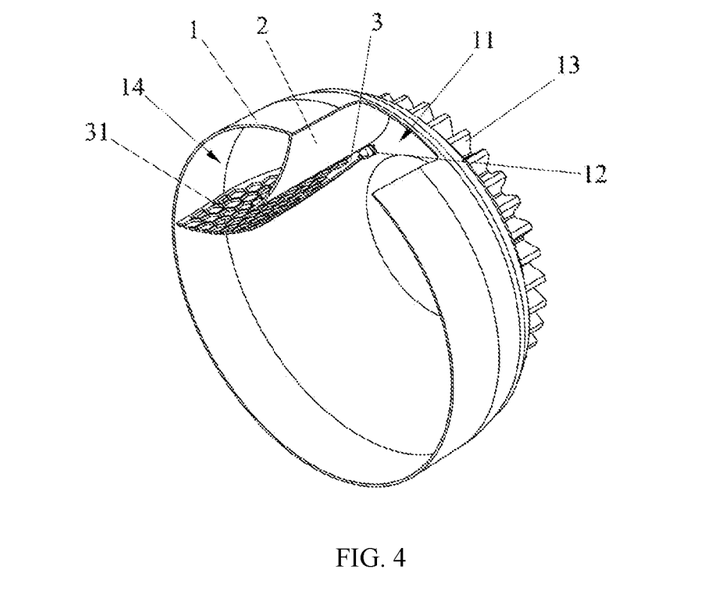
FIG. 4 is a transverse semi-sectional view of an excrement screening device according to an embodiment of the present disclosure.
Figure 5:
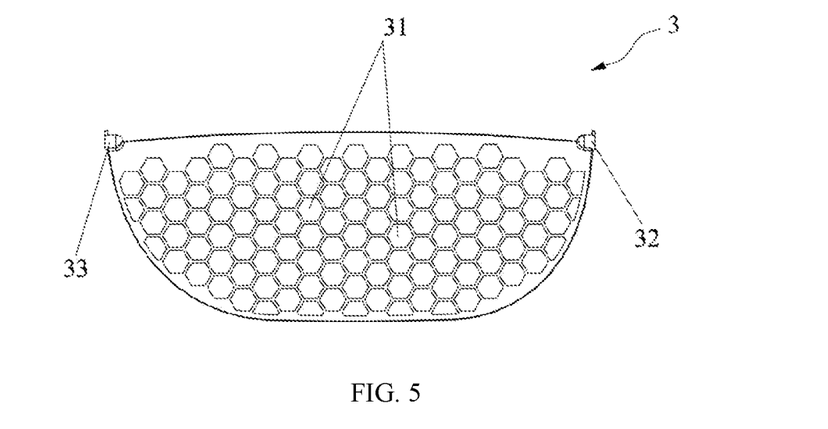
FIG. 5 is a schematic structural view of a screening piece according to an embodiment of the present disclosure.
Figure 6:
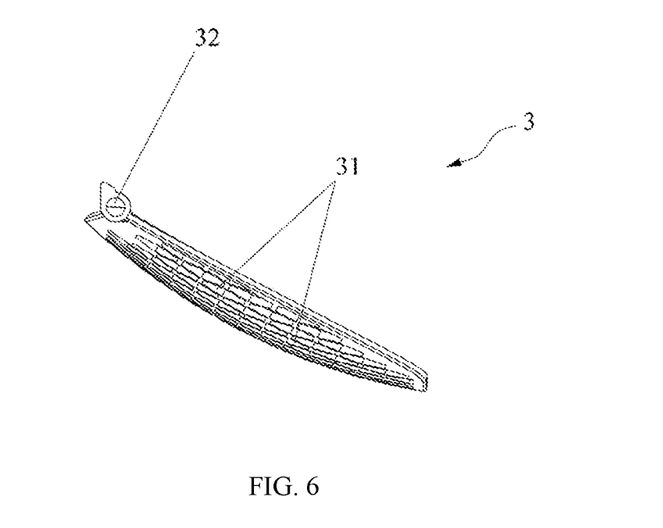
FIG. 6 is a side view of a screening piece according to an embodiment of the present disclosure.

As shown in FIGS. 5 and 6, to facilitate subsequent cleaning and maintenance of the screening piece 3, in one example, the screening piece 3 is detachably and pivotally connected in the rotary receiving piece 1. Since a part of the excrement 200 and the cat litter 100 are adhered to the screening piece 3 and even plug the screening holes 31, the screening effect becomes poor after the screening piece 3 is used for a period of time, so the screening piece 3 needs to be replaced and cleaned regularly. In this embodiment, the screening piece 3 is mounted in the rotary receiving piece 1 by adopting a detachable pivot structure, so that the efficiency of replacing and cleaning the screening piece 3 is improved, and the service life of the product is prolonged. To facilitate disassembly and assembly, in one example, a first mounting shaft 12 (shown in FIGS. 3 and 4) and a second mounting shaft (not shown in the figures) are disposed on an inner side wall of the rotary receiving piece 1. One end of the screening piece 3 is provided with a first mounting sleeve 32 (shown in FIGS. 5 and 6) for being engaged with the first mounting shaft 12, and the other end is provided with a second mounting sleeve 33 (shown in FIG. 5) for being engaged with the second mounting shaft. As shown in FIG. 6, to increase the screening contact area, in on example, the screening piece 3 is formed to be an arc-shaped protrusion facing away from the accommodating cavity 14, increasing the screening efficiency without reducing the volume of the accommodating cavity 14.

The excrement screening device provided by the embodiment has working principles described below.

Figure 7:
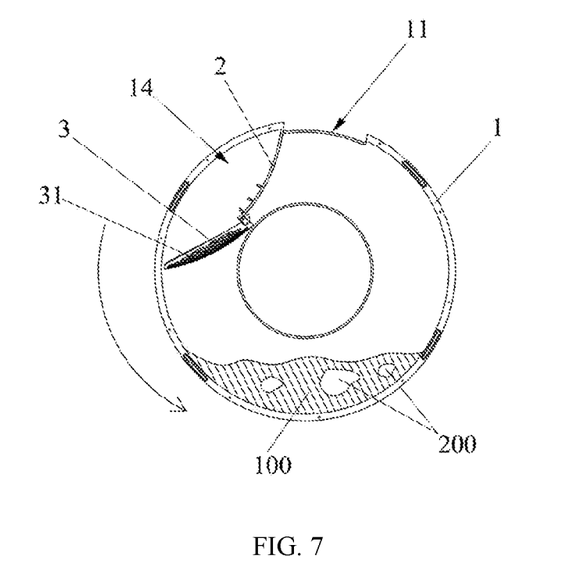
FIG. 7 is a working schematic diagram of an excrement screening device according to an embodiment of the present disclosure.

As shown in FIG. 7, the rotary receiving piece 1 is in the initial position, the cat litter 100 mixed with cat excrement 200 is laid on the bottom of the rotary receiving piece 1, and the rotary receiving piece 1 is caused by the drive assembly to rotate along the first direction (a counterclockwise direction) from the initial position.

Figure 8:
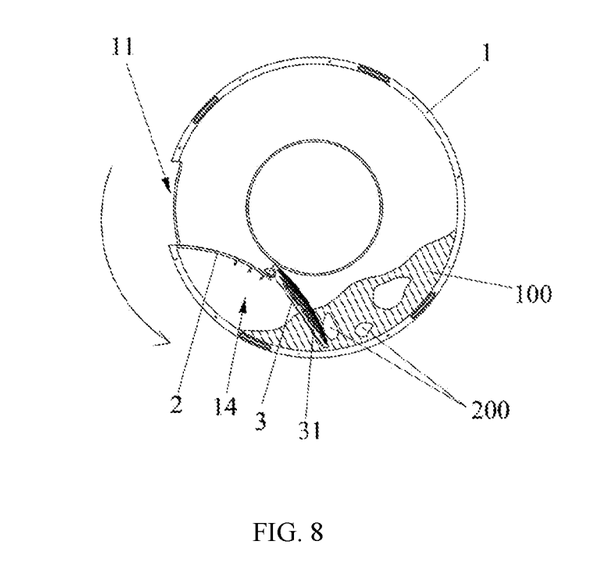
FIG. 8 is a working schematic diagram of an excrement screening device according to another embodiment of the present disclosure.
Figure 9:
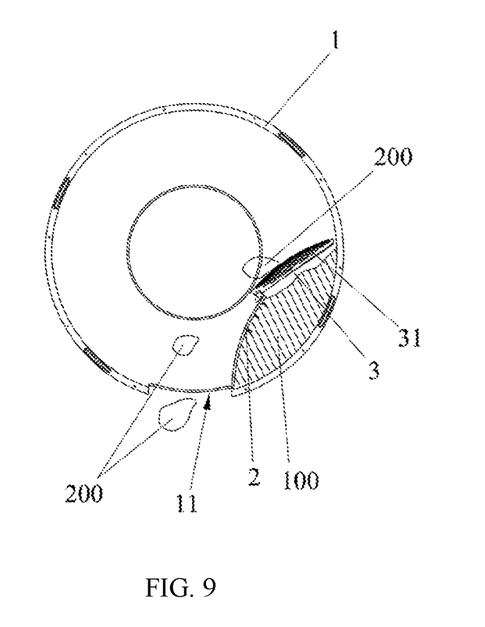
FIG. 9 is a working schematic diagram of an excrement screening device according to another embodiment of the present disclosure.

As shown in FIGS. 8 and 9, during the process of the rotary receiving piece 1 rotating along the first direction, the screening piece 3 gradually comes into contact with the cat litter 100 mixed with the cat excrement 200 and screens the excrement 200. The excrement 200 (adhered with a small amount of cat litter 100) is relatively large and cannot pass through the screening holes 31 of the screening piece 3, while the cat litter 100 is relatively small and can pass through the screening holes 31 of the screening piece 3 to enter the accommodating cavity 14, the cat litter 100 is prevented by the litter blocking piece 2 from flowing out of the waste discharge outlet 11, and then the excrement 200 is discharged through the waste discharge outlet 11 under the action of gravity.

Figure 10:
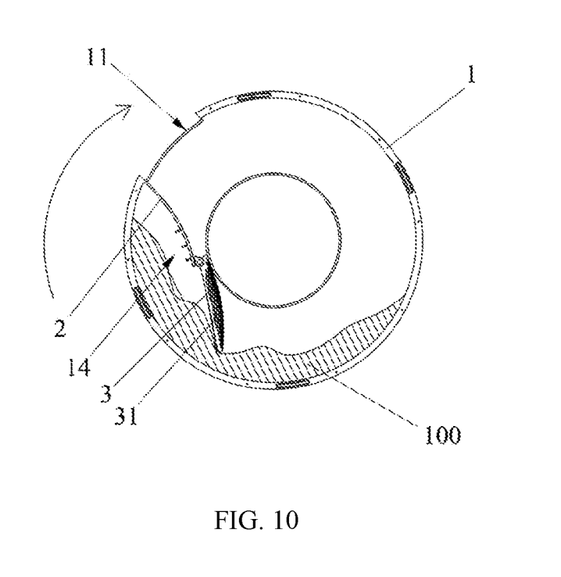
FIG. 10 is a working schematic diagram of an excrement screening device according to another embodiment of the present disclosure.
Figure 11:
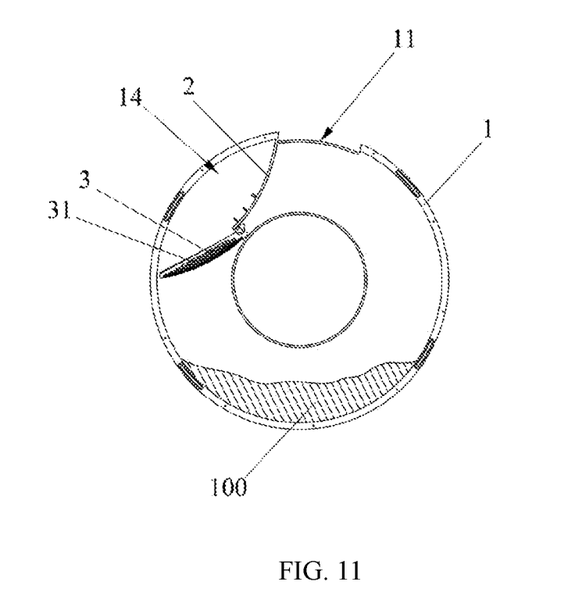
FIG. 11 is a working schematic diagram of an excrement screening device according to another embodiment of the present disclosure.

As shown in FIGS. 10 and 11, the rotary receiving piece 1 is caused to rotate along the direction (a clockwise direction) opposite to the first direction, the cat litter 100 pushes the screening piece 3 away, and the screening piece 3 rotates counterclockwise by a certain angle about the pivot thereof, so that the cat litter 100 can be conveniently and quickly restored to a preset position.

According to the excrement screening device provided by the present disclosure, the cat litter is placed in the rotary receiving piece. After a pet cat excretes the excrement into the cat litter and exits the rotary receiving piece 1, the rotary receiving piece 1 is caused to rotate along the first direction, and the cat litter mixed with the excrement is filtered and screened through the screening holes of the screening piece. Then the cat litter enters the accommodating cavity and is blocked by the litter blocking piece. As the rotary receiving piece 1 rotates, under the action of gravity, the excrement screened from the surface of the screening piece is discharged through the waste discharge outlet. The rotary receiving piece rotates along a direction opposite to the first direction to the initial position, and the clean cat litter in the accommodating cavity returns to a preset position.

The excrement screening device provided by the embodiment is simple in structure, convenient to operate, in high degree of automation and environment-friendly and sanitary, provides a good and clean defecation place for the pet cat, and achieves automatic cleaning of pet cat's excrement 200. The cat litter 100 does not need to be replaced regularly, a waste of the cat litter in use 100 is avoided, and manual litter shoveling and litter discharging are not needed, thus bringing pleasant keeping experience to the owner.

The embodiment further provides an excrement screening method. The method uses the above-mentioned excrement screening device, and includes the steps described below.

In S10, the rotary receiving piece 1 rotates along the first direction from the initial position.

In S20, the cat litter 100 mixed with the excrement 200 is filtered and screened through the screening piece 3.

In S30, the cat litter 100 enters the accommodating cavity 14 and is blocked by the litter blocking piece 2.

In S40, the excrement 200 is discharged through the waste discharge outlet 11.

In S50, the rotary receiving piece rotates to the initial position along the direction opposite to the first direction.

In S60, the cat litter in the accommodating cavity 14 returns to the preset position.

To protect the pet cat, in one example, before the step S10, the following step is performed: detecting whether the pet cat passes through the inlet and outlet 15 of the rotary receiving piece 1 twice or not.

After the cat litter 100 is used for multiple times, to discharge the old cat litter 100 out of the rotary receiving piece 1, in one example, after the step S60, the following steps are performed: the rotary receiving piece 1 continues to rotate along the direction opposite to the first direction from the initial position; and the cat litter 100 is discharged through the waste outlet 11.

The excrement screening method provided by the embodiment is convenient to operate, in high degree of automation, and environment-friendly and sanitary, provides a good and clean defecation place for the pet cat, and achieves automatic cleaning of pet cat's excrement 200.

Manual litter shoveling and litter discharging are not needed, thus bringing pleasant keeping experience to the owner.

What is claimed is:

1. An excrement screening device, comprising:
   a rotary receiving piece, which is configured to receive cat litter, wherein the rotary receiving piece is provided with a waste discharge outlet;
   a litter blocking piece, which is disposed in the rotary receiving piece, wherein the litter blocking piece is configured to block the cat litter in a case where the rotary receiving piece rotates along a first direction; and
   a screening piece, which is disposed in the rotary receiving piece, wherein the screening piece is provided with a plurality of screening holes, and an accommodating cavity is formed by the screening piece, the litter blocking piece and the rotary receiving piece;
   wherein the screening piece is detachably and pivotally connected in the rotary receiving piece; and
   wherein an inner side wall of the rotary receiving piece is provided with a first mounting shaft and a second mounting shaft, one end of the screening piece is provided with a first mounting sleeve for being engaged with the first mounting shaft, and another end of the screening piece is provided with a second mounting sleeve for being engaged with the second mounting shaft.

2. The excrement screening device according to claim 1, further comprising: a supporting seat, wherein the supporting seat is provided with a plurality of auxiliary supporting wheels configured to bear the rotary receiving piece.

3. The excrement screening device according to claim 2, wherein a waste discharge channel is disposed in the supporting seat, and a storage box is disposed below the waste discharge channel.

4. The excrement screening device according to claim 1, wherein the rotary receiving piece is connected to a drive assembly and the drive assembly is configured to drive the rotary receiving piece to rotate about an axis of the rotary receiving piece.

5. An excrement screening method, using an excrement screening device, wherein the excrement screening device comprises:
 a rotary receiving piece, which is configured to receive cat litter, wherein the rotary receiving piece is provided with a waste discharge outlet, wherein the rotary receiving piece rotates along a first direction from an initial position;
 a litter blocking piece, which is disposed in the rotary receiving piece, wherein the litter blocking piece is configured to block the cat litter in a case where the rotary receiving piece rotates along the first direction; and
 a screening piece, which is disposed in the rotary receiving piece, wherein the screening piece is provided with a plurality of screening holes, and an accommodating cavity is formed by the screening piece, the litter blocking piece and the rotary receiving piece,
 and wherein the excrement screening method comprises:
 before the rotary receiving piece rotating along the first direction from the initial position, detecting whether or not a pet cat passes through an inlet and outlet of the rotary receiving piece twice;
 cat litter mixed with excrement being filtered and screened through a screening piece;
 the cat litter entering an accommodating cavity and being blocked by a litter blocking piece;
 the excrement being discharged through a waste discharge outlet;
 the rotary receiving piece rotating to the initial position along a direction opposite to the first direction; and
 the cat litter in the accommodating cavity returning to a preset position.

6. The excrement screening method according to claim 5, further comprising: after the cat litter in the accommodating cavity returning to the preset position,
 the rotary receiving piece continuing to rotate along the direction opposite to the first direction from the initial position; and
 the cat litter being discharged through the waste discharge outlet.

7. The excrement screening method according to claim 5, wherein the screening piece is detachably and pivotally connected in the rotary receiving piece.

8. The excrement screening method according to claim 7, wherein an inner side wall of the rotary receiving piece is provided with a first mounting shaft and a second mounting shaft, one end of the screening piece is provided with a first mounting sleeve for being engaged with the first mounting shaft, and another end of the screening piece is provided with a second mounting sleeve for being engaged with the second mounting shaft.

9. The excrement screening method according to claim 5, wherein the excrement screening device further comprises: a supporting seat, wherein the supporting seat is provided with a plurality of auxiliary supporting wheels configured to bear the rotary receiving piece.

10. The excrement screening method according to claim 9, wherein a waste discharge channel is disposed in the supporting seat, and a storage box is disposed below the waste discharge channel.

11. The excrement screening method according to claim 5, wherein the rotary receiving piece is connected to a drive assembly and the drive assembly is configured to drive the rotary receiving piece to rotate about an axis of the rotary receiving piece.

12. An excrement screening method, using an excrement screening device, wherein the excrement screening device comprises:
 a rotary receiving piece, which is configured to receive cat litter, wherein the rotary receiving piece is provided with a waste discharge outlet, wherein the rotary receiving piece rotates along a first direction from an initial position;
 a litter blocking piece, which is disposed in the rotary receiving piece, wherein the litter blocking piece is configured to block the cat litter in a case where the rotary receiving piece rotates along the first direction; and
 a screening piece, which is disposed in the rotary receiving piece, wherein the screening piece is provided with a plurality of screening holes, and an accommodating cavity is formed by the screening piece, the litter blocking piece and the rotary receiving piece,
 wherein the screening piece is detachably and pivotally connected in the rotary receiving piece;
 wherein an inner side wall of the rotary receiving piece is provided with a first mounting shaft and a second mounting shaft, one end of the screening piece is provided with a first mounting sleeve for being engaged with the first mounting shaft, and another end of the screening piece is provided with a second mounting sleeve for being engaged with the second mounting shaft;
 and wherein the excrement screening method comprises:
 cat litter mixed with excrement being filtered and screened through a screening piece;
 the cat litter entering an accommodating cavity and being blocked by a litter blocking piece;
 the excrement being discharged through a waste discharge outlet;
 the rotary receiving piece rotating to the initial position along a direction opposite to the first direction; and
 the cat litter in the accommodating cavity returning to a preset position.

* * * * *